United States Patent [19]

Marlowe et al.

[11] Patent Number: 5,190,342
[45] Date of Patent: Mar. 2, 1993

[54] TRACTOR-TRAILER AERODYNAMIC DRAG REDUCTION APPARATUS AND METHOD

[75] Inventors: Huston Marlowe, Orinda; John C. Lindsley, Felton, both of Calif.

[73] Assignee: Paccar Inc., Bellevue, Wash.

[21] Appl. No.: 764,529

[22] Filed: Sep. 24, 1991

[51] Int. Cl.$^5$ .............................................. B62D 35/00
[52] U.S. Cl. ................................ 296/180.2; 296/180.4; 296/190; 280/423.1
[58] Field of Search ............... 296/180.2, 180.4, 180.1, 296/190; 280/403, 423.1, 400

[56] References Cited

U.S. PATENT DOCUMENTS

| | | | |
|---|---|---|---|
| D. 238,161 | 12/1975 | De Vaughn | D12/16 |
| 387,382 | 8/1988 | Weems | 105/1.1 |
| 2,101,793 | 12/1937 | Field, Jr. | 296/180.1 |
| 2,193,155 | 3/1940 | Antoine | 280/403 |
| 2,514,695 | 7/1950 | Dempsey | 296/180.2 |
| 3,425,740 | 2/1969 | De Vaughn | 296/180.4 |
| 3,711,146 | 1/1973 | Madzsar et al. | 296/180.2 |
| 3,834,752 | 9/1974 | Cook et al. | 296/180.2 |
| 3,971,586 | 7/1976 | Saunders | 296/180.4 |
| 4,021,069 | 5/1977 | Hersh | 296/180.4 |
| 4,036,519 | 7/1977 | Servais et al. | 296/180.2 |
| 4,142,755 | 3/1979 | Keedy | 296/180.4 |
| 4,156,543 | 5/1979 | Taylor et al. | 296/180.3 |
| 4,193,629 | 3/1980 | Merkle | 296/180.2 |
| 4,210,354 | 7/1980 | Canning | 296/180.4 |
| 4,245,862 | 1/1981 | Buckley, Jr. | 296/180.4 |
| 4,343,506 | 8/1982 | Saltzman | 296/180.2 |
| 4,397,496 | 8/1983 | Drygas, III | 296/180.2 |
| 4,518,188 | 5/1985 | Witten | 296/180.1 |
| 4,611,847 | 9/1986 | Sullivan | 296/180.2 |
| 4,904,015 | 2/1990 | Haines | 296/180.3 |
| 5,078,448 | 1/1992 | Selzer et al. | 296/180.2 |

FOREIGN PATENT DOCUMENTS 2550726  5/1977  Fed. Rep. of Germany .

*Primary Examiner*—Robert R. Song
*Attorney, Agent, or Firm*—Flehr, Hohbach, Test, Albritton & Herbert

[57] ABSTRACT

A truck tractor-trailer assembly having reduced aerodynamic drag. The skins of the tractor cab and trailer extend longitudinally toward each other and terminate in opposed trailing and leading edges which are as close together as possible while still permitting a full range of yaw and upward pitch about a fifth wheel assembly coupling the trailer to the tractor. In addition to accommodating yaw and upward pitch, the tractor-trailer skin edges are separated by a minimum clearance distance determined by manufacturing tolerances, plus clearances in the fifth wheel assembly, plus elastic deformation of components, plus the range of maximum roll of the tractor frame. An optimal construction employing concentric spherical surfaces is shown, as are embodiments having minimum skin and volume gaps meeting other design criteria. A method of reducing aerodynamic drag by reducing tractor-trailer skin and volume gaps also is described.

49 Claims, 8 Drawing Sheets

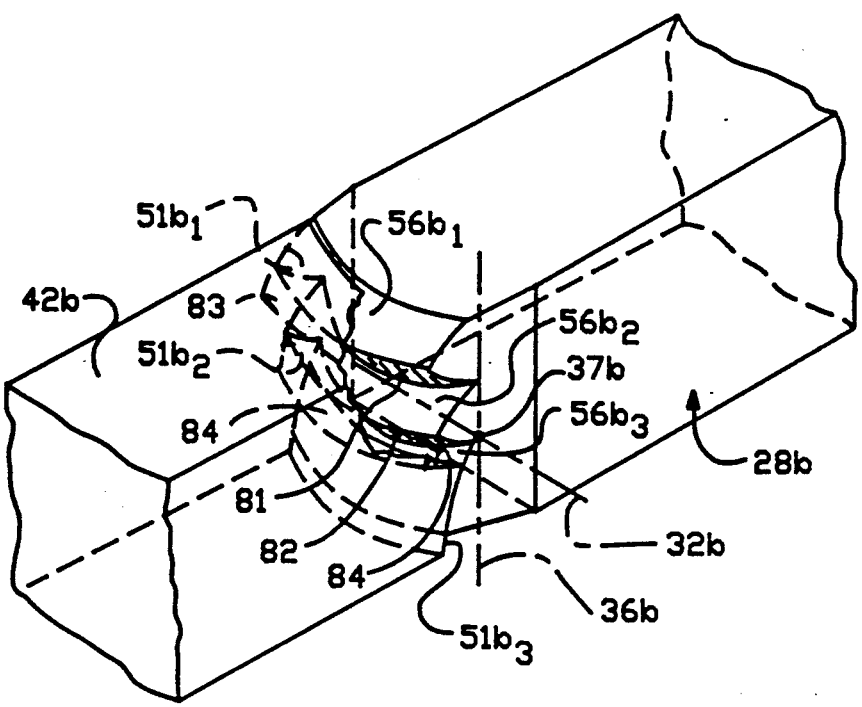
FIG.—4A
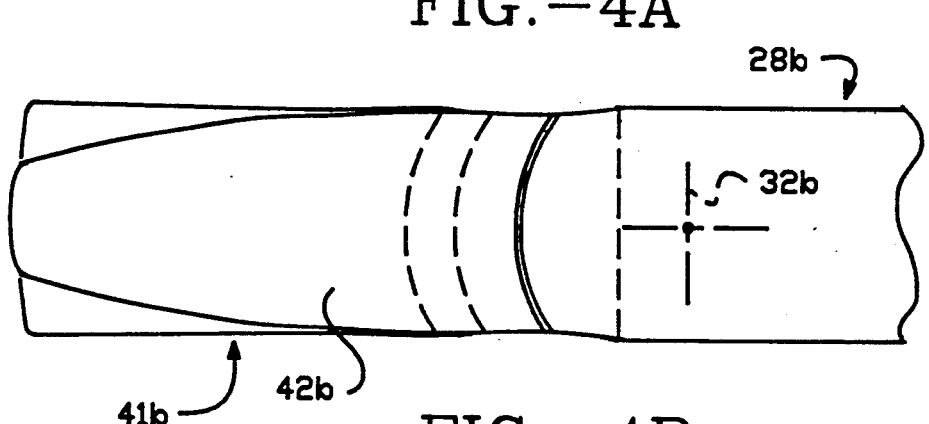
FIG.—4B
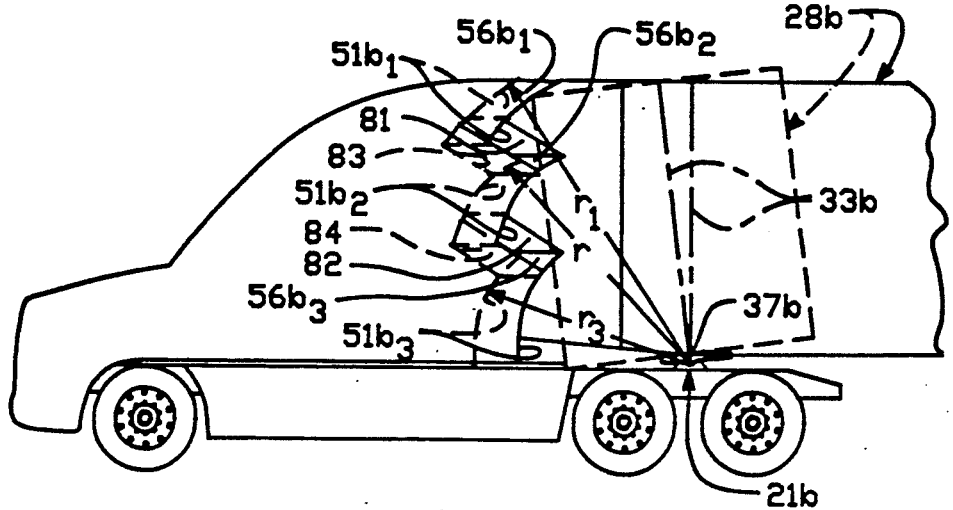
FIG.—4C

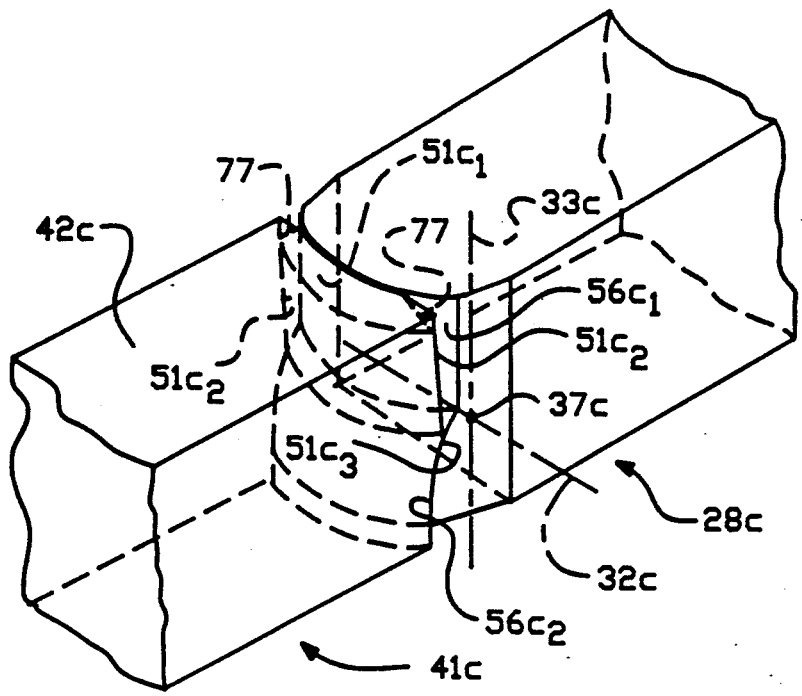
FIG.—5A
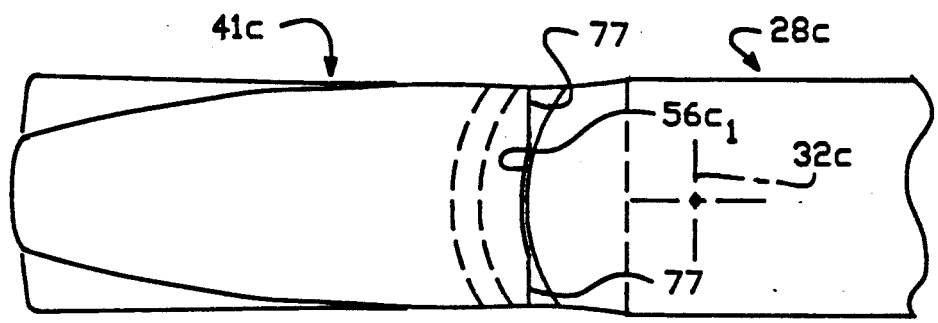
FIG.—5B
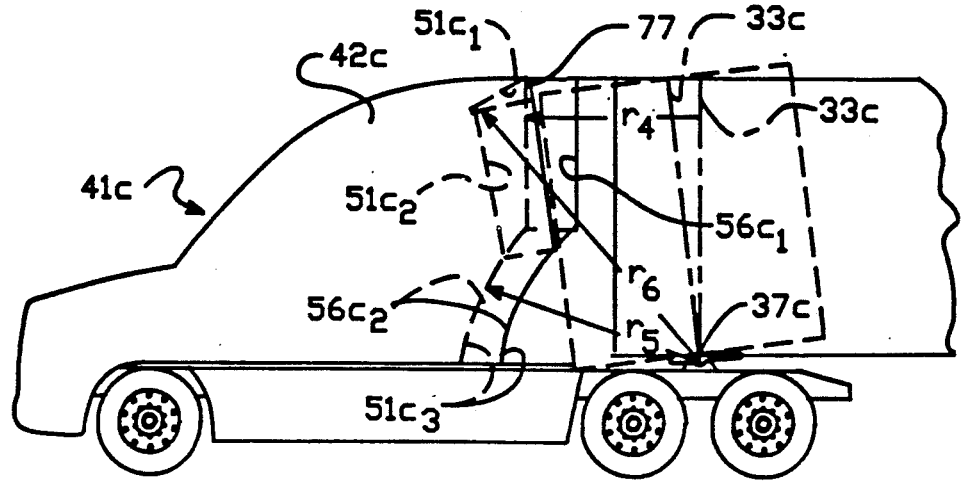
FIG.—5C

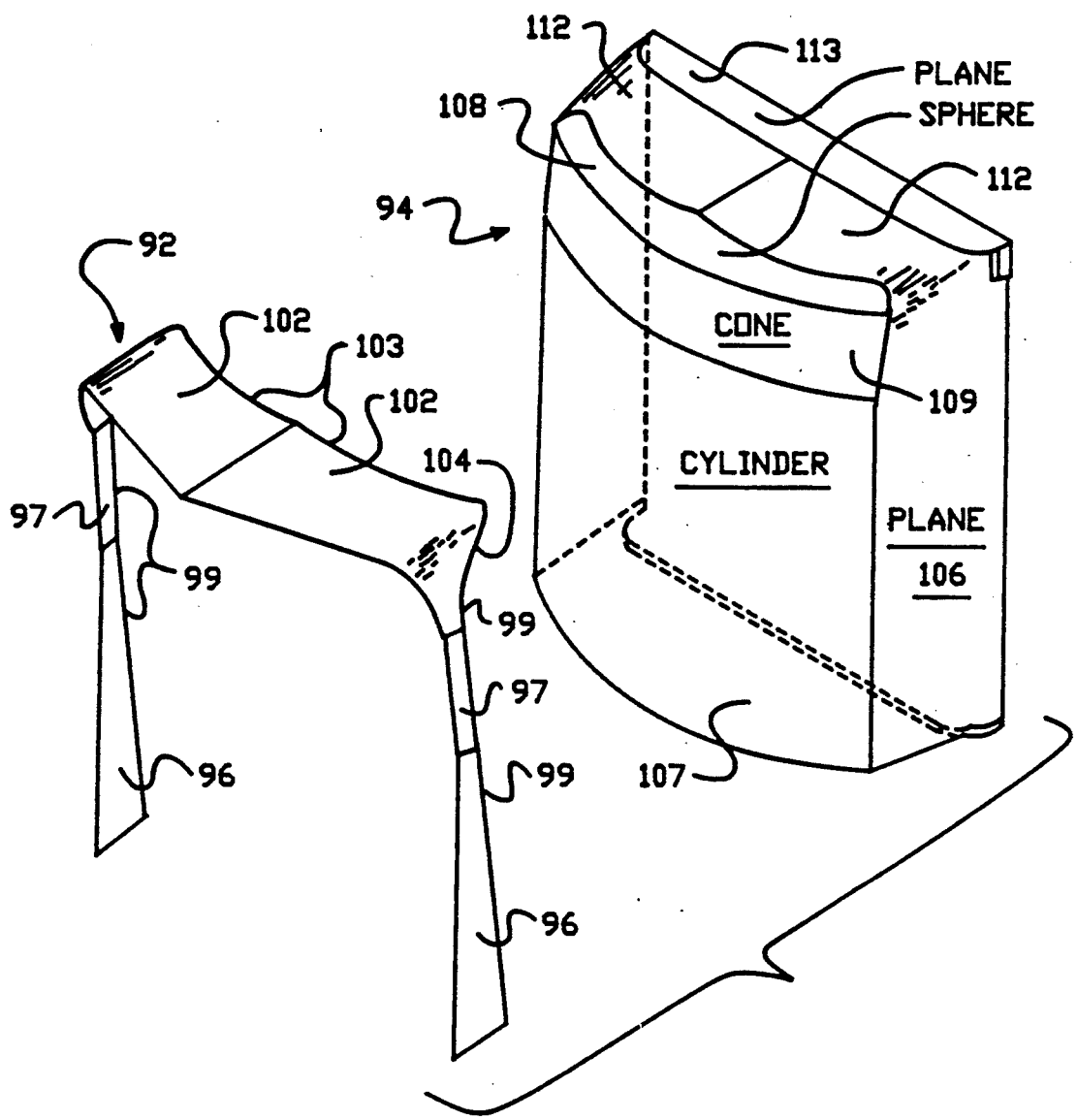
FIG.—6C

TRACTOR-TRAILER AERODYNAMIC DRAG REDUCTION APPARATUS AND METHOD

TECHNICAL FIELD

The present invention relates, in general, to an apparatus and method for reducing aerodynamic drag on vehicles having articulated bodies. More particularly, the present invention relates to an apparatus and method for effecting drag reduction between a truck tractor cab assembly and a trailer body which is coupled to the tractor by a "fifth wheel" assembly.

BACKGROUND ART

Considerable effort has been directed toward reducing vehicle aerodynamic drag by sealing or spanning the air gap between the bodies of articulated vehicles. Thus, the railroad, bus, and truck industries all have devoted considerable time and resources toward this end. Reducing aerodynamic drag has the effect of increasing vehicle efficiency, which is usually reflected in the form of better vehicle fuel mileage. Both the surface or skin gap between adjacent bodies of articulated vehicles and the volume gap between the bodies contribute to the overall vehicle drag.

While this problem has been addressed in connection with buses and railroad cars, the trucking industry is faced with the most difficult air drag problems because the relative articulation between the vehicle bodies is the greatest. Typically, for trucks the maximum required yaw, that is, articulation about a substantially vertical axis through the fifth wheel assembly, is between about 90 and 110 degrees in each direction measured from a longitudinal straight-ahead running alignment. The maximum required relative pitch about a horizontal pitch axis intersecting with the yaw axis, usually at the fifth wheel assembly, is between about 5 to about 7 degrees. Finally, truck tractor frames will undergo dynamic torsional rotation or helixing about a horizontal roll axis, which also typically is about 5 to 7 degrees in both directions.

One approach which has been the subject of numerous patents, but has not been widely adopted in the trucking industry is to attempt to span or seal the gap between vehicle bodies by fairings, panels, resilient bodies or the like. Thus, U.S. Pat. Nos. 4,611,847, 4,397,496, 4,343,506, 4,141,755, 4,036,519, 3,834,752, 3,711,146, 3,425,740, 2,101,793 and D238,161 all disclose articulated truck tractor-trailer assemblies having side and top structures which extend across the gap between the cab assembly and the trailer body to reduce the vehicle's aerodynamic drag.

A third compromise approach also has been employed, namely, a combination of gap spanning mechanical structures and air deflectors.

These prior art mechanical gap-spanning systems, however, tend to suffer from problems of reliability and operating inconvenience. Some must be moved or removed to permit full relative articulation of the vehicle bodies, while others often cannot reliably accommodate repeated articulation, particularly at large angles. Additionally, movable, inflatable and elastic panel systems, particularly if they require deployment controls, can add significantly to the cost of the tractor-trailer assembly and they can be difficult to retro-fit to existing vehicles. Such mechanical gap-spanning devices also often present problems when the trailer must be detached or separated from the tractor, which may be required several times a day in some applications.

Another basic drag reduction approach which has been widely used in the trucking industry is to employ various fairings or deflectors on the tractor cab assemblies and/or trailer bodies to attempt to deflect air efficiently across the gap between cab assemblies and trailer bodies. Thus, U.S. Pat. No. 4,021,069 to Hersh, U.S. Pat. No. 2,514,695 to Dempsey, U.S. Pat. No. 4,210,354 to Canning and U.S. Pat. No. 3,971,586 to Saunders are typical of trailer-mounted nose cone assemblies, and U.S. Pat. No. 4,245,862 to Buckley, and U.S. Pat. No. 4,904,015 to Haines and German Patent No. 25 50 726 are typical of cab mounted deflectors or fairings.

Fairings and deflectors seek to present a more aerodynamic front for the vehicle assembly and/or smooth the air flow over the gap between the articulated bodies. While in some instances these systems reduce the skin gap and/or volume gap between bodies, such gap reduction is incidental and often there is still a very substantial tractor-trailer gap. Thus, aerodynamic drag reduction across the air gap between adjacent articulated truck bodies is only partially achieved by fairings and deflectors.

U.S. Pat. Nos. 4,518,188 and 4,156,543 employ a combination of side panels which are used to span the gap along the sides of the tractor-trailer assemblies, while roof-mounted air deflector assemblies are used to reduce drag across the roof assembly. Such compromise systems have some of the disadvantages of both gap spanning and air deflection.

In the mass-transit industry, articulated buses are well known which have accordion-like gap-spanning sleeves. These sleeves, however, are primarily designed to prevent access to the space between the bus bodies. The buses tend to operate at relatively low speeds, at which drag is not a serious problem, and the accordion pleats do not provide an optimum gap-spanning surface for air flow.

Similarly, U.S. Pat. No. 2,193,155 to Antoine is directed to an articulated bus in which a special midbody virtual pivot assembly is used to provide a walk-through passageway between the articulated components of the bus. The Antoine apparatus is designed to solve the problem of providing a walk-through, not to solve the problem of drag reduction. In fact, the Antoine assembly includes a substantial skin and volume gap in the top surface between the articulated bodies, it cannot accommodate relative articulation through large angles, it has no provision for accommodating relative roll between the bus components, and the trailing body cannot be separated from the lead body.

In the railroad industry U.S. Pat. No. 387,382 to Weems is typical of a gap-spanning system as applied to trains. The problems associated with rail-mounted vehicles, however, are much less severe since the yaw articulation angles are relatively small, and the pitch and roll articulation angles are virtually nil as compared to those in the trucking industry.

Accordingly, it is an object of the present invention to provide an aerodynamic drag reduction apparatus and method suitable for use on trucks to significantly reduce the aerodynamic drag which results from the gap between articulated bodies of such vehicles.

It is another object of the present invention to provide a tractor-trailer drag reduction apparatus and method which does not rely upon a plurality of mechanical and/or moving parts to effect drag reduction.

It is still a further object of the present invention to provide a tractor-trailer drag reduction apparatus and method which enables utilization of a standard fifth wheel assembly of the type widely employed in the trucking industry.

Apparatus and method of the present invention have other objects and features of advantage which will become more apparent from, and are set forth in detail in, the following Best Mode of Carrying Out the Invention and the accompanying drawings.

DISCLOSURE OF THE INVENTION

The present invention is directed to reduction of the aerodynamic drag in a truck tractor-trailer assembly. The truck tractor typically includes a frame and a cab assembly mounted to the frame. The cab assembly has a body with an outwardly facing side and top cab skin. The trailer has a body with a bottom wall and outwardly facing side and top skins. The trailer is pivotally coupled or articulated to the frame of the tractor by a fifth wheel assembly.

The improvement in the tractor-trailer assembly of the present invention is comprised, briefly, of the side and top cab skin and the side and top trailer skin extending toward each other and terminating in opposed side and top trailing cab skin edges and leading trailer side and top skin edges which are separated longitudinally from each other by a substantially reduced gap distance which is determined by a combination of:

(i) a maximum required relative yaw in both directions of the tractor and trailer about a substantially vertical yaw axis positioned through the fifth wheel assembly, and (ii) a maximum required relative upward pitch of the tractor and trailer about a substantially horizontal transversely disposed pitch axis positioned below the bottom wall of the trailer through the fifth wheel assembly, plus (iii) a radial clearance distance determined by a combination of manufacturing tolerances, clearances in the fifth wheel assembly, elastic deformation of components, and the maximum required relative roll in both directions of the tractor and trailer about a horizontally extending longitudinal roll axis. The location of the fifth wheel assembly between the bottom surface of the trailer body and the tractor frame causes the yaw pitch axes to be located below and behind the trailer bottom and front walls, respectively. Thus, in the apparatus and method of the present invention, the geometry of relative articulation of the tractor and trailer about the pitch, roll and yaw axes is used to locate the trailing cab skin edges and the leading trailer skin edges so that the two come as close together as possible while still permitting the full required or designed relative articulation.

BRIEF DESCRIPTION OF THE DRAWINGS

FIG. 4A is a fragmentary, top perspective schematic view, partially broken away, of an alternative embodiment of the tractor-trailer assembly of the present invention showing stepped spheroidal and conical mating cab and trailer opposed walls.

FIG. 4B is a fragmentary, top plan view of the assembly of FIG. 4A.

FIG. 4C is a side elevation view of the assembly of FIG. 4A with the trailer shown in solid lines in straight-ahead running alignment and shown in broken lines rotated by about 90 degrees about the yaw axis and pitched upwardly by about 7 degrees.

FIG. 5A is a fragmentary, top perspective schematic view of a further alternative embodiment of the tractor-trailer assembly of the present invention showing mating spheroidal and cylindrical tractor and trailer opposed walls.

FIG. 5B is a fragmentary, top plan view of the assembly of FIG. 5A.

FIG. 5C is a fragmentary, side elevation view of the assembly of FIG. 5A with the trailer shown in solid lines in straight ahead running alignment and shown in broken lines rotated by about 90 degrees about the yaw axis and rotated by about 7 degrees about the pitch axis.

FIG. 6C is an exploded top perspective view of the cab assembly fairings and trailer nose cone employed in the tractor-trailer assembly of FIG. 6A.

BEST MODE OF CARRYING OUT THE INVENTION

The tractor-trailer drag reduction apparatus and method of the present invention will be described in detail in connection with a typical highway tractor-freight van combination. It will be understood, however, that the drag reduction apparatus and method of the present invention can be applied to various trucking applications, such as tank trucks, and that it also can be employed in connection with mass transit vehicles such as buses and trains. As above set forth, however, the performance criteria in the trucking industry is the most difficult to satisfy and the need for the present invention is greatest as applied to trucks.

Broadly, the present invention seeks to reduce aerodynamic drag between articulated vehicle bodies, not by spanning the gap or using deflectors, or a combination thereof, but by reducing the skin gap, and preferably the volume gap to a minimum while still permitting the full required yaw, pitch, and roll.

Figure 1A:
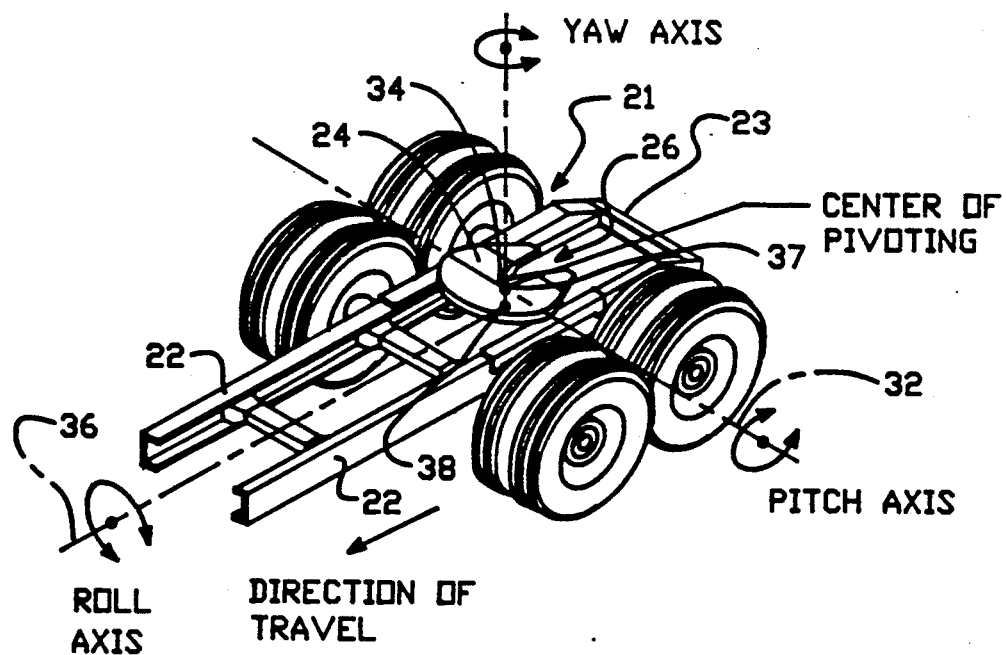
FIG. 1A is a fragmentary, top perspective view of the rear of a tractor frame having a conventional fifth wheel assembly mounted thereto.
Figure 1B:
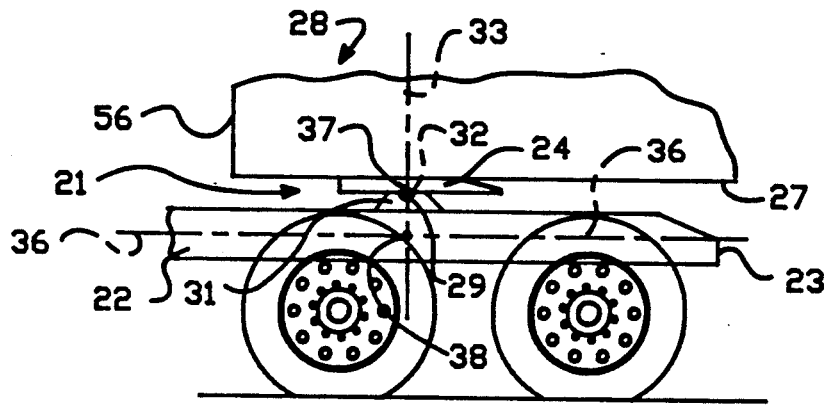
FIG. 1B is a fragmentary, side elevation view of the tractor frame of FIG. 1A, with a trailer body mounted to the fifth wheel assembly.
Figure 1C:
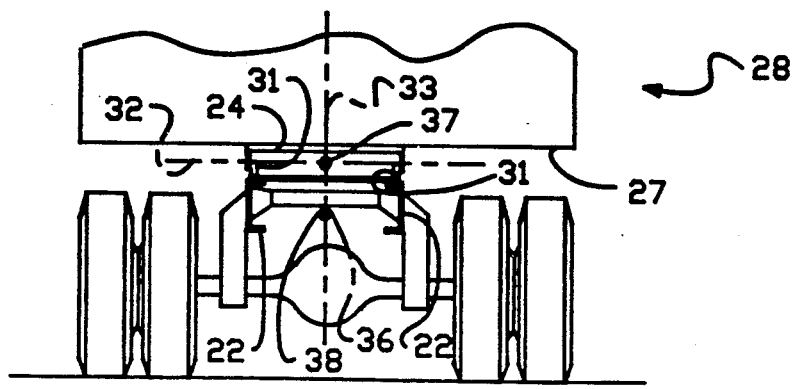
FIG. 1C is a fragmentary, end elevation view of the assembly of FIG. 1B.

FIGS. 1A, 1B and 1C illustrate a typical "fifth wheel" assembly, generally designated 21, of the type widely used in the trucking industry. Fifth wheel assembly 21 is mounted to a ladder-type tractor frame on framerails 22 proximate the aft end 23. The fifth wheel assembly includes a load bearing or support plate 24 having a v-shaped notch 26 dimensioned to receive a kingpin (not shown) mounted to bottom wall 27 of a trailer, generally designated 28 (FIGS. 1B and 1C).

The support plate 24 in fifth wheel assembly 21 is pivoted about pin or axle 29 (FIG. 1B) to brackets 31 carried by each of frame rails 22. This pivoting establishes a substantially horizontal transverse pitch axis 32 which allows relative upward and downward pitching of the tractor and trailer during use. As used herein, the expression "relative upward pitch" shall include elevation of the tractor front end or trailer rear end, or a combination thereof, relative to the fifth wheel assembly.

Since fifth wheel plate 24 is supported by a pair of brackets 31, each of which are carried by frame rails 22, the plate is held against rotation about a vertical axis in the position shown at FIG. 1A. Yawing or rotation of the trailer and tractor about a substantially vertical yaw axis 33 is permitted by rotatable receipt of the trailer kingpin in socket 34 of the support plate. Fifth wheel assembly 21 further includes a mechanism (not shown) for latching the trailer kingpin in plate socket 34 for rotational movement about yaw axis 33.

Fifth wheel assembly 21 is standard in every respect and does not comprise a novel portion of the present invention. Nevertheless, the fifth wheel assembly and its geometric relationship to tractor frame 22 and trailer body 28 is central to the tractor-trailer drag reduction apparatus and method of the present invention.

In addition to the relative yaw and pitch articulation permitted by fifth wheel assembly 21, the ladder-type frame assembly of the tractor will experience a helical or torsional displacement about a longitudinally-extending roll axis 36 that has a virtual pivot along a center line of the frame (FIG. 1C) and at mid-height of frame rails 22 (FIG. 1B). As may be seen in FIGS. 1A-1C, therefore, substantially vertically-extending yaw axis 33 intersects substantially horizontally-extending pitch axis 32 at a center of pivoting 37, and yaw axis 33 intersects roll axis 36 at a second intersection point 38, which is slightly below center of pivoting 37. Both of these intersections occur below the bottom wall 27 of the trailer and behind front end 56 of the trailer 28.

The tractor-trailer drag reduction apparatus and method of the present invention seeks to achieve drag reduction by minimizing the skin gap between the cab assembly and trailer of a truck tractor-trailer assembly. It also seeks to reduce aerodynamic drag by minimizing the gap volume between the cab assembly and the trailer body. Both of these ends are accomplished in the present invention without the use of moving parts. Thus there are no hinged panels, curtains, tracks, rollers, springs or air bags of the type employed in the prior art. Instead, the apparatus and method of the present invention adapts the configuration of the rear cab assembly and the nose or front end of the trailer assembly to the geometry of the fifth wheel coupling of the trailer to the truck tractor.

Figure 2A:
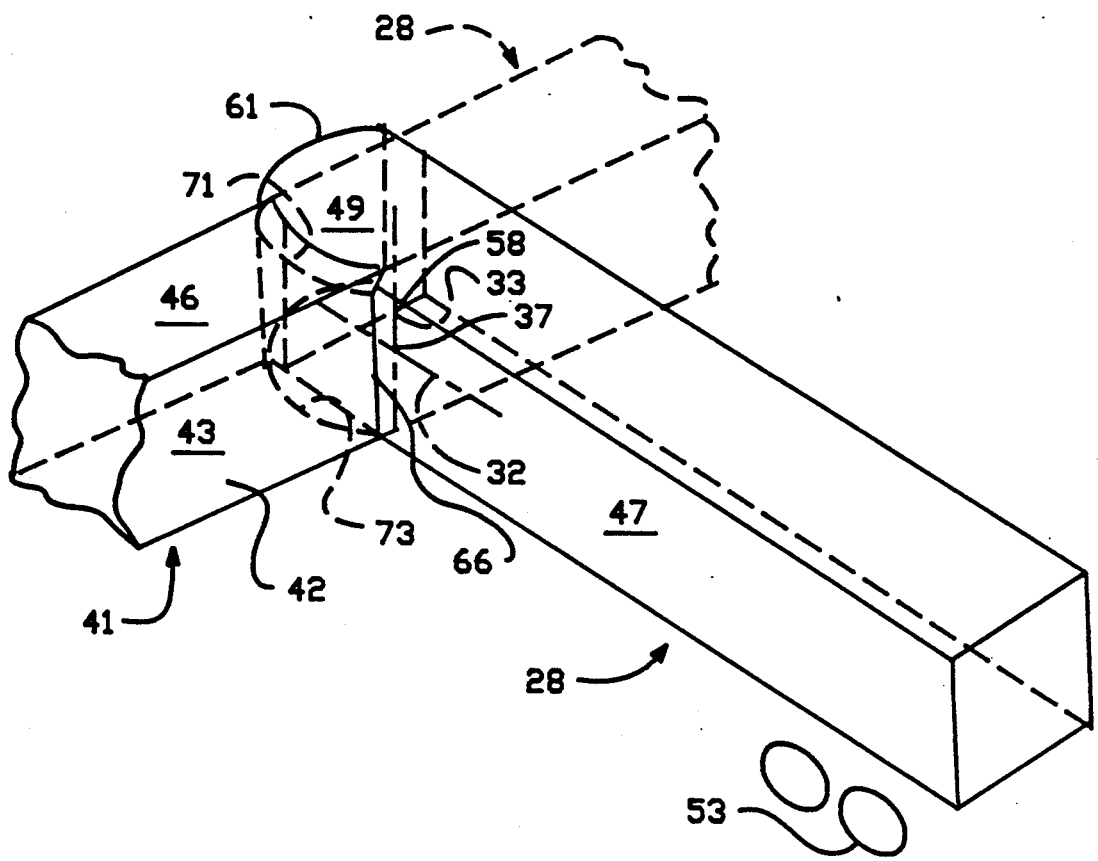
FIG. 2A is a fragmentary, top perspective, schematic view of a tractor-trailer assembly constructed in accordance with the present invention and showing in solid lines the trailer yawed by about 90 degrees and pitched upward by about 7 degrees relative to the tractor and showing the trailer in dotted lines in the straight-ahead running orientation.
Figure 2B:
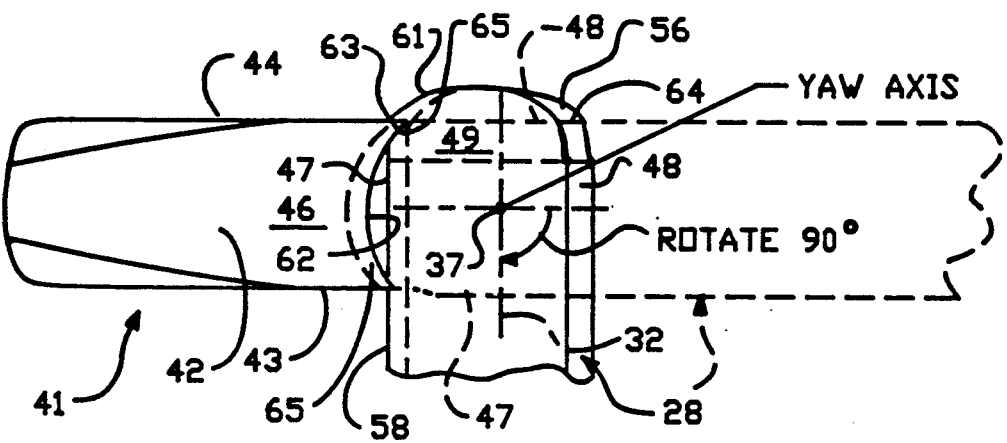
FIG. 2B is a fragmentary, top plan view of the assembly of FIG. 2A.
Figure 2C:
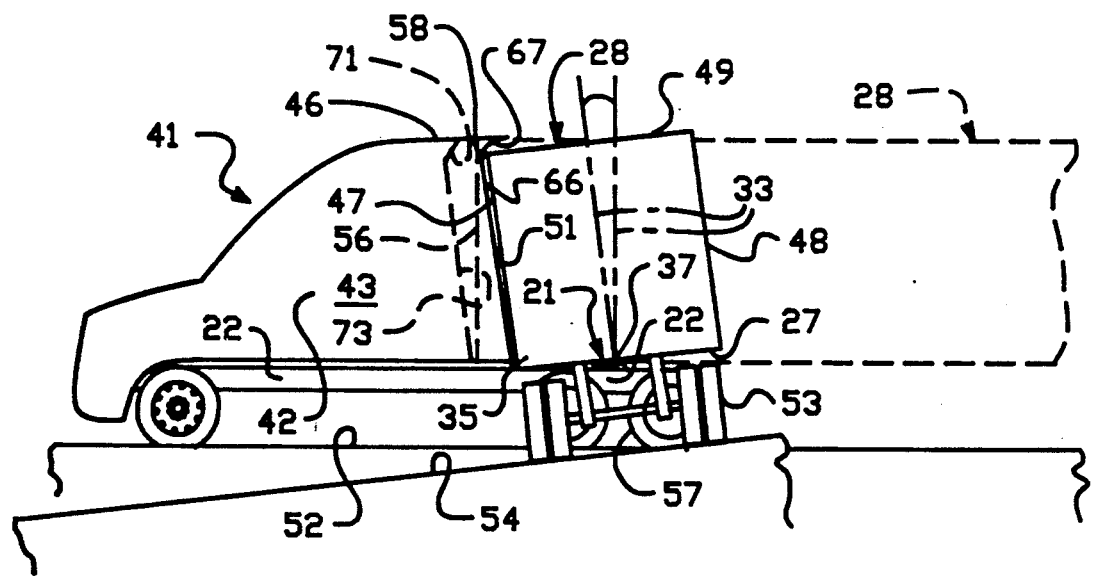
FIG. 2C is a fragmentary, side elevation view of the assembly of 2A illustrating maximum upward pitch of the trailer on the fifth wheel assembly.

FIGS. 2A, 2B and 2C illustrate one embodiment of the drag reduction system of the present invention. As will be seen, trailer 28 is coupled to a tractor, generally designated 41, which has a cab assembly 42 mounted on frame rails 22 (FIG. 2C). Fifth wheel assembly 21 joins the two bodies together for pivotal movement about yaw axis 33 and pitch axis 32.

As is typical of highway truck tractors, cab assembly 42 may include a cab, sleeper box and various roof fairings, cab or sleeper box extenders, and side trim tabs. Collectively, however, these structures are referred to herein as the cab assembly or cab. Cab assembly 42 includes an outwardly-facing cab skin, which in rectangular configurations includes opposed side cab skins 43 and 44 and outwardly and upwardly-facing top cab skin 46. It will be understood, however, that a myriad of possible combinations and cab shapes can comprise the cab body skin.

Similarly, trailer body 28 in generally rectangular bodies will include opposed outwardly-facing trailer side skins 47 and 48 and outwardly and upwardly-facing roof or top skin 49. In tankers with round bodies the side skins 47 and 48 and the top skin 49 are continuous or merge into each other along undefined lines.

A primary object of the present invention, therefore, is to reduce aerodynamic drag by minimizing the gap between the cab and trailer skins, while at the same time accommodating the articulation between the tractor and trailer which is required for trucking applications.

The present invention achieves minimum tractor-trailer skin gap by providing side and top cab skin and side and top trailer skin which extend toward each other and terminate in opposing cab trailing edges and trailer leading edges which are spaced from each other in a longitudinal direction, when the tractor-trailer are straight-ahead running, by a gap distance determined by a combination of the following:

i) a maximum required relative yaw in both directions of tractor 41 and trailer 28 about yaw axis 33, and ii) a maximum required relative upward pitch of tractor 41 and trailer 28 about pitch axis 32, and iii) a radial clearance distance determined by a combination of manufacturing tolerances, clearances in fifth wheel assembly 21, elastic deformation or beaming of components, and a maximum required relative roll in both directions of tractor 41 and trailer 28 about roll axis 36.

In FIGS. 2A-2C trailer 28 is shown in a straight-ahead running position in broken lines. In the usual highway tractor-freight van configuration, the height and width of trailer 28 will be substantially matched or similar to the height and width of cab assembly 42 proximate rear wall 51 of the cab assembly. The apparatus and method of reducing drag by minimizing the skin and volume gap of the present invention can be practiced for cabs and trailers which are not substantially matched in transverse cross-section, but such mismatched cabs and trailers may produce more drag by reason of the mismatch than can be saved by minimizing the skin and/or volume gap between the two.

In the most typical matched situation when in a straight-ahead running condition, therefore, outer cab skin surfaces 43, 44 and 46 are substantially aligned with outer trailer skin surfaces 47, 48 and 49. This encourages flow of air over the cab outer skin to reattach to the trailer outer skin after crossing the gap between the tractor and trailer.

Most truck tractor-trailer assemblies must be capable of yaw about axis 33 by at least 90 degrees in both directions from the straight-ahead running position. In FIGS. 2A-2C, trailer 28 is shown in solid lines in a position which has been yawed by about 90 degrees. The maximum required or designed yaw for tractor-trailer combinations can be as high as 110 degrees, and if desired, even higher.

FIGS. 2A-2C also illustrate relative pitching between tractor 41 and trailer 28. As best may be seen in FIG. 2C, tractor 41 is resting on a level surface 52, while trailer wheels 53 are supported on inclined surface 54. This will cause pitching (not roll) about pitch axis 32 of the fifth wheel. As will be seen from FIGS. 1A and 1B, pitch axis 32 is stationary in the straight-ahead running position because the fifth wheel support plate 24 does not rotate. The kingpin on the trailer rotates within socket 34.

In conventional truck tractor-trailer assemblies the maximum required or designed relative pitch is usually between about 5 and about 7 degrees about horizontal pitch axis 32. Since fifth wheel assembly 21 is located between bottom wall 27 and frame rails 22, relative downward pitch of the tractor and trailer causes the rear wall 51 of cab assembly 42 and the front wall 56 of trailer 28 to separate from each other over the full height of the juxtaposed rear and front walls. Similarly, when rotated by 90 degrees, or at maximum yaw, downward pitch of the trailer relative to the tractor causes side walls 47 and 48 of the trailer to separate or move away from rear wall 51 of the cab assembly.

However, when trailer 28 is pitched upwardly about pitch axis 32 front wall 56 of the trailer converges with rear wall 51 of the tractor. Similarly, when at maximum yaw, side walls 47 and 48 converge with rear wall 51. Accordingly, the location of the coupling between tractor 41 and trailer 28 at the bottom surface of trailer 28 results in only the maximum required relative upward pitch about horizontal pitch axis 32 as controlling design of the opposed cab and trailer skin and wall assemblies. It also should be noted that upward relative pitch causes lower corner 35 (FIG. 2C) of trailer 28 to converge with framerails 22, and sufficient clearance with respect to the framerails also must be provided to accommodate about 7 degrees of upward pitch.

In addition to the combination of yaw and pitch, however, tractor ladder frame 22 can roll. In FIG. 2C, for example, if trailer rear wheels 53 were elevated relative to tractor rear wheels 57 the upper corner 58 of trailer 28 would be elevated by reason of rolling of tractor frame 22 about longitudinal roll axis 36. The effects of roll, however, tend to be limited to the most elevated portions of the cab assembly body. Thus, yaw and pitch can be used to design cab and trailer skins and walls, with roll displacement used as an increment in the clearance radius or to add a roll adaptation, such as removing the over-hanging corners 65 of the cab body (FIG. 2B) which would be impacted by trailer upper corner or rail 58.

Finally, it will be appreciated that there will be relative manufacturing tolerances in the various components and clearances exist in fifth wheel assembly 21 that require a small clearance radius or additional spacing between the opposed cab assembly skin edges and trailer skin edges, as well as walls 51 and 56. Additionally, various cab and trailer components will experience elastic deformation under dynamic conditions, sometimes referred to as "beaming."

In FIGS. 2A-2C, therefore, one can see that the trailing cab skin edges and leading trailer skin edges can be brought into extremely close juxtaposed relationship for straight-ahead running, while still accommodating relative articulation between the two bodies through the maximum required or designed yaw, pitch and roll.

In the form of the invention shown in FIGS. 2A-2C top trailer leading edge 61 is formed as a circle having a center of curvature on yaw axis 33. The top cab trailing edge 62 similarly is a circle from yaw axis 33, but with a radius of curvature which is larger than the radius of trailer skin edge 61 by a clearance distance which accommodates a combination of manufacturing tolerances, fifth wheel clearances, elastic deformation, and maximum roll. The trailer side leading skin edges 63 and 64 (FIG. 2B) extend towards tractor 41 and the cab assembly trailing edges to a position at which they are intersected by the cylindrical front trailer skin at edge 61. Trailing cab side skin edges 66 can be seen in FIG. 2C to be forwardly inclined by the maximum required or designed pitch which side walls 47 and 48 can undergo while in maximum yaw. Additionally, an upper portion of trailing cab side skin edge 67 is an arcuate edge, namely, a line on a sphere having a center of curvature at the intersection between the yaw and pitch axes, i.e., center of pivoting 37 of fifth wheel 21. The radius of trailing edge portion 67 is large enough to accommodate manufacturing tolerances, clearances in the fifth wheel, elastic deformation and maximum roll, in addition to the distance to the top corner 58 of the trailer.

With the opposed trailing and leading edges of skins of the tractor and trailer so formed, the skin gap distance between the two bodies in straight-ahead running condition will be substantially reduced while still permitting full relative articulation. The skin gap is not optimal in that the forwardly pitched cab trailing edge 66 results in a triangular skin gap in the straight-ahead running condition. The skin gap, however, is minimized for a cylindrical front wall 56 and an optimal skin gap configuration will be described in connection with the embodiment of FIGS. 3A-3C.

The skin gap reduction achieved in the embodiment of FIGS. 2A-2C, however, achieves significant aerodynamic drag reduction as compared to conventional tractor-trailer combinations, and it achieves such a drag reduction even if rear wall 51 and front wall 56 are not formed as mating surfaces. It is, however, an important additional feature of the present invention to construct opposed walls 51 and 56 to conform, nest or mate with each other as closely as possible so as to reduce the drag produced by air movement in the gap volume between bodies. Stationary ambient air is essentially pumped transversely between the bodies by the movement of the vehicle, especially when there are side winds. Thus, fuel is consumed accelerating the stationary air mass which enters the gap volume up to vehicle speed. Minimizing the gap volume in the embodiment of FIGS. 2A-2C can be accomplished by forming rear cab wall 51 with an upper spherical surface 71 and a lower cylindrical surface 73. Upper spherical surface 71 has a center of curvature at center of pivoting 37 and lower cylindrical surface 73 has a radius of curvature about yaw axis 33 in the maximum upward-pitched condition. The front wall 56 of trailer 28 is a cylindrical surface having a center of curvature about the unpitched yaw axis 33.

This configuration, as will be explained in more detail below, does not achieve optimal gap volume between the rear and front walls, but again it minimizes the gap volume for a cylindrical front wall 56. The volume between the opposed walls is larger than optimum because in the unpitched and straight-ahead running condition as shown in FIG. 2C in dotted lines, front trailer wall 56 is separated at the top of the trailer from rear wall 51 of the cab assembly by a wedge-shaped volume which is larger than optimum, namely, the volume required for manufacturing tolerances, fifth wheel clearances, elastic deformation and maximum roll.

Figure 3A:
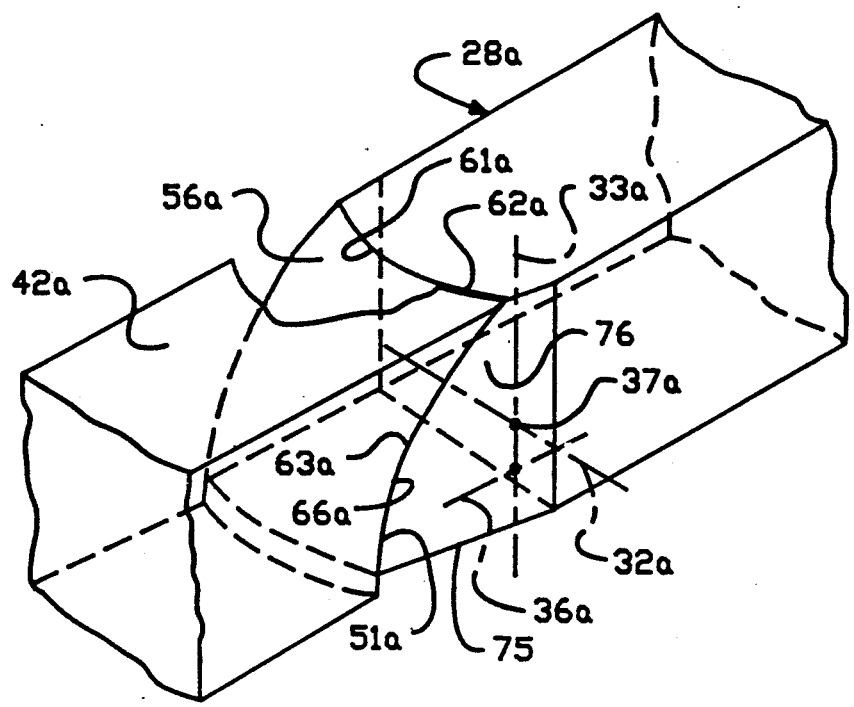
FIG. 3A is a fragmentary, top perspective schematic view, partially broken away, of an alternative embodiment of the tractor-trailer assembly of the present invention showing concentric spheroidal surfaces with a center of curvature at the fifth wheel assembly.
Figure 3B:
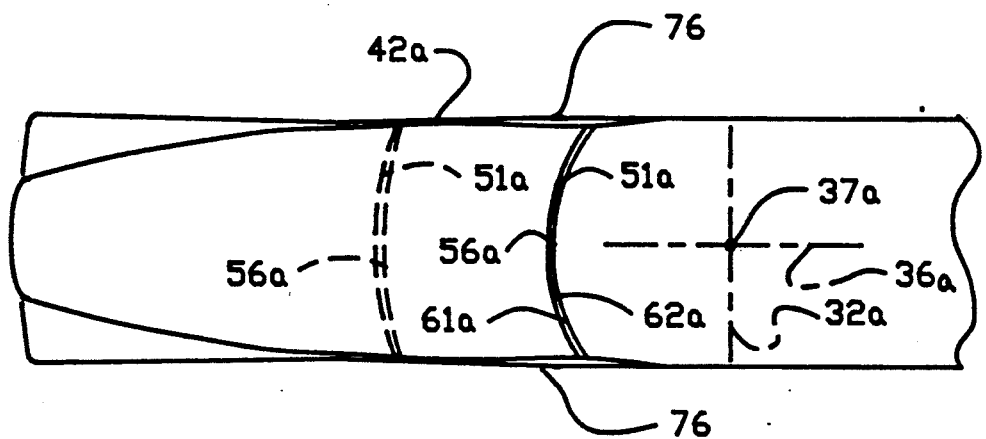
FIG. 3B is a fragmentary, top plan view of the assembly of FIG. 3A.
Figure 3C:
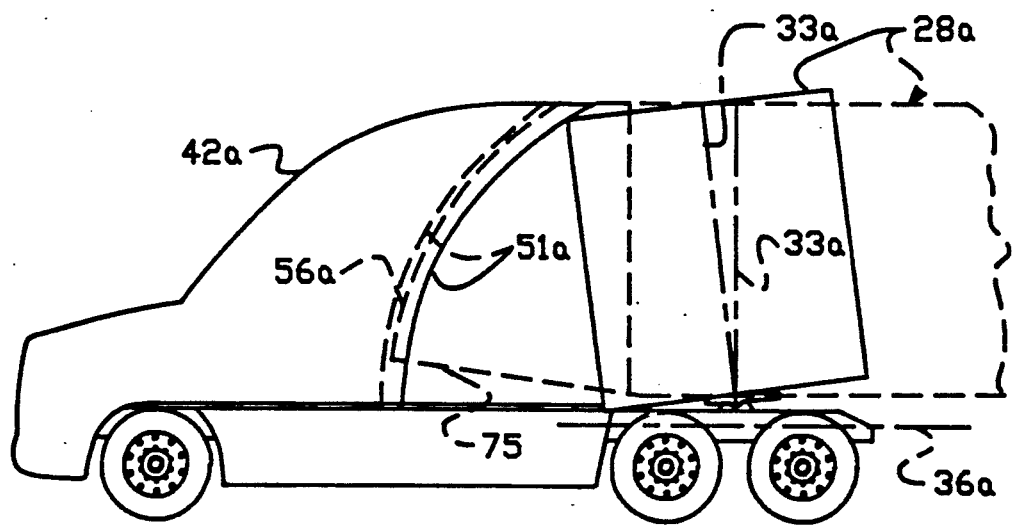
FIG. 3C is a fragmentary, side elevation view of the assembly of FIG. 3A with the trailer shown rotated about the yaw axis by about 90 degrees and upwardly pitched by about 7 degrees.

Turning now to FIGS. 3A, 3B and 3C, a truck tractor-trailer assembly is shown in which not only the skin gap between the bodies is optimized, but the volumetric gap between the opposed cab rear wall and trailer front wall has been optimized. In the form of the invention shown in these FIGURES, front surface $56a$ of trailer $28a$ is a spherical surface having a center of curvature at $37a$, the intersection between yaw axis $33a$ and pitch axis $32a$. The corresponding rear wall or surface $51a$ of cab assembly $42a$ also is a mating spherical surface having a center of curvature at intersection point $37a$. However, the radius of curvature of spherical surface $51a$ is slightly larger than the radius of curvature of surface $56a$ by a distance sufficient to accommodate the combination of manufacturing tolerances, fifth wheel clearances, elastic deformation, and maximum required roll in both directions about roll axis $36a$. As can be seen from FIGS. 3A-3C, therefore, not only are the opposed top leading and trailing edges $61a$ and $62a$, and opposed side leading and trailing edges $63a$ and $66a$ at minimum gap distances, but the opposed walls $51a$ and $56a$ intermediate the edges also are separated by a minimum gap distance.

Flow over the truck tractor-trailer assembly of FIGS. 3A-3C will readily reattach from the cab to the trailer and transverse pumping or flow of ambient air through the gap between the cab rear wall and trailer front wall will be minimized. This embodiment, therefore, is the best case or achieves the greatest drag reduction using the apparatus and method of the present invention.

As best may be seen in FIGS. 3A and 3C, the nose cone or front portion of trailer $28a$ should have an upwardly inclined bottom wall portion at 75 to accommodate upward pitching of the trailer. Additionally, the trailer may include inwardly converging side panels 76 to conform the trailer width dimension to the cab width dimension at the juncture between the two. Such adaptations also would be employed in the assembly of FIGS. 2A-2C.

Referring now to FIGS. 4A-4C, a further alternative embodiment of the truck tractor-trailer assembly of the present invention is shown. In the embodiment of FIGS. 4A-4C the optimal skin gap and optimal volume gap of the embodiment of FIGS. 3A-3C have both been compromised somewhat in order to maintain a more near vertical average cab assembly rear wall. Trailer assembly $28b$ is formed with stepped or interrupted spherical surfaces $56b_1$, $56b_2$ and $56b_3$. Each one of the trailer front wall spherical surfaces $56b_1$–$56b_3$ has a center of curvature at point $37b$, which is the intersection between yaw axis $33b$ and pitch axis $32b$. The radii of curvature, $r_1$, $r_2$ and $r_3$ are different to provide the stepping that increases the usable interior cab volume.

Obviously this configuration also results in a trailer front wall which is more nearly vertical.

The spherical surfaces $56b_1$–$56b_3$ of the trailer front wall are connected by pitch compensating surfaces 81 and 82 (FIGS. 4A and 4C). Surfaces 81 and 82 are conical surfaces having intersection point $37b$ as their apex and the yaw axis $33b$ as their central axis.

In order to minimize the skin and volume gap while still permitting full relative articulation, the rear wall of tractor $41b$ and cab assembly $42b$ is formed with corresponding spherical and conical surfaces, but the spherical surfaces are offset by an angular distance equal to the maximum upward pitch beyond the corresponding spherical surfaces $56b_1$–$56b_3$, plus a tolerance factor. Thus, spherical cab rear wall surface $51b_1$, spherical cab rear wall surface $51b_2$ and spherical cab wall surface $51b_3$ all are offset circumferentially by an amount which will accommodate maximum upward pitch, as indicated by the angle between yaw axis positions $33b$ in FIG. 4C. The respective radii of spherical surfaces $51b_1$–$51b_3$ from center of curvature $37b$ are equal to the radii $r_1$, $r_2$ and $r_3$ plus a clearance distance equal to the manufacturing tolerances, the clearance in fifth wheel assembly $21b$, and the maximum required roll about the roll axis of the tractor. Surfaces 83 and 84 which connect the spherical rear cab wall portions $51b_{11}$–$51b_3$ are conical surfaces having their apex at center of pivoting $37b$ and for their central longitudinal axis, yaw axis $33b$ in the pitched up condition of trailer $28b$, as shown in dotted lines.

As best can be seen in FIG. 4C, however, the stepped spherical structure of this embodiment does result in gaps between the cab side skins and the trailer side skins. Additionally, there are pitch accommodating volume gaps between the trailer front wall and the cab assembly rear wall. Nevertheless, these gaps are minimal in nature and a significant overall reduction in aerodynamic drag is achieved while still accommodating the full range of yaw, pitch and roll required in the trucking industry.

It will be apparent from FIG. 4C that the closest distance to the fifth wheel pitch axis of all points on the rear wall of the cab assembly and the cab skin trailing edges which is possible is determined by orienting the trailer side wall and top wall or roof at maximum required yaw, upward pitch and roll. This position limits the approach to the pitch axis of all cab rear wall and skin elements in all gap reduction designs. In FIG. 3C, therefore, the minimum radius of the mating spherical rearwall $51a$ also is limited to a combination maximum yaw, pitch and roll of the trailer side and top walls.

It should be noted in connection with FIGS. 4B and 5B that all the arcuate broken lines which would represent the various edges of the spherical and conical surfaces have not been shown for simplicity of illustration.

The embodiment of the truck tractor-trailer assembly of the present invention shown in FIGS. 5A–5C similarly results in a more vertical usable cab interior, but it also compromises somewhat from the optimum skin gap and volume gap between the vehicle bodies. Trailer $28c$ is formed with an upper front wall portion $56c_1$ which is cylindrical and has for its central axis yaw axis $33c$. Lower trailer front wall portion $56c_2$ is spherical with a center of curvature located at intersection point $37c$ between yaw axis $33c$ and pitch axis $32c$. As seen in FIG. 5C, therefore, surface $56c_1$ has a radius $r_4$ from axis $33c$ and lower trailer front wall $56c_2$ has a radius $r_5$ from point $37c$.

The mating rear cab wall is formed by three wall portions. First, there is an upper spherical portion or surface $51c_1$ having a radius of curvature $r_6$ (FIG. 5C) from center of curvature 37c. Next, there is a cylindrical surface $51c_2$ having as its central axis yaw axis 33c when in a pitch condition, as shown in FIG. 5C. The third rear wall portion is spherical surface $51c_3$ which again has a center of curvature at point 37c. Again, the radii of curvature of the spherical surfaces $51c_1$ and $51c_3$ and the radius of cylindrical surface $51c_2$, all are greater than their corresponding trailer front wall surfaces by an amount equal to the combined amount required for manufacturing tolerances, fifth wheel clearance, and elastic deformation. In the embodiment of FIGS. 5A-5C, however, maximum roll in both directions is accommodated by a roll adaptation in which the most elevated and outside corners of cab assembly 42c have been removed by cut plane 77.

As will be seen in FIG. 5C, the embodiment of FIGS. 5A-5C results in a skin and volume gap in the upper half of the vehicle which is larger than optimum. Nevertheless, this embodiment effects a significant drag reduction while accommodating a full range of articulation between tractor 41c and trailer 28c.

Figure 6A:
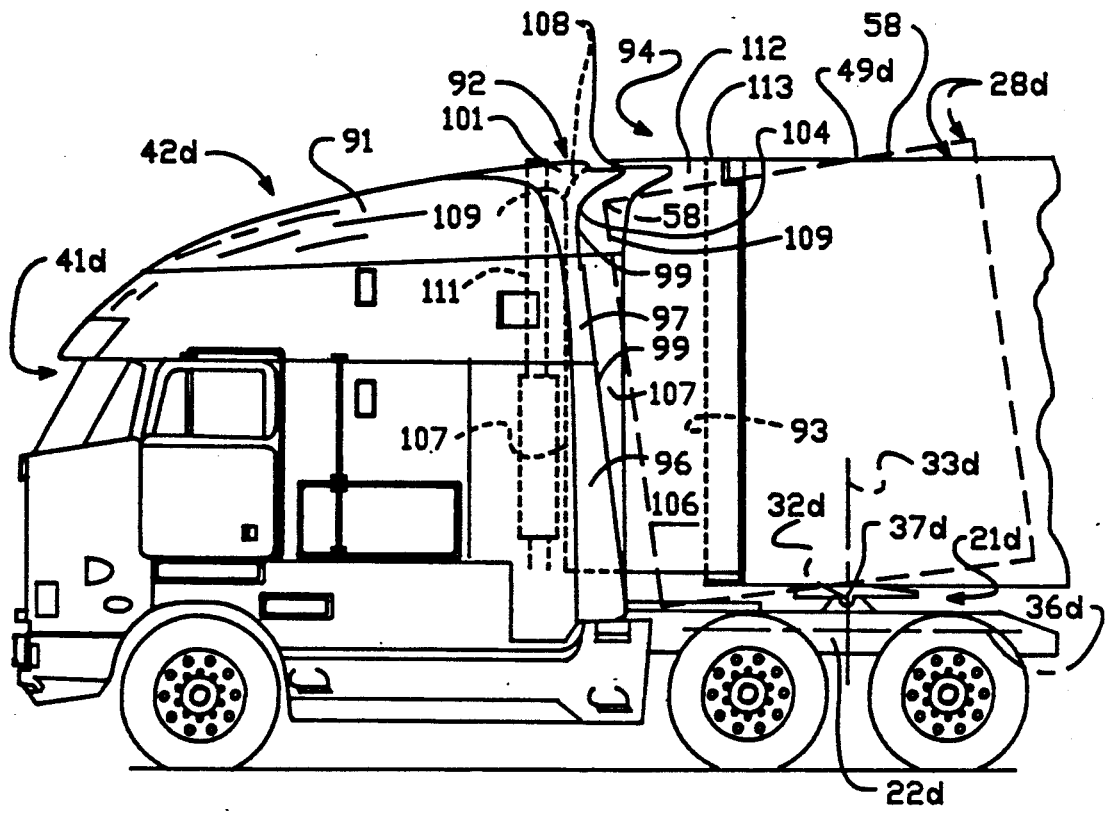
FIG. 6A is a fragmentary, side elevation view of a tractor-trailer assembly having a cab fairing and a trailer nose cone constructed in accordance with the present invention.
Figure 6B:
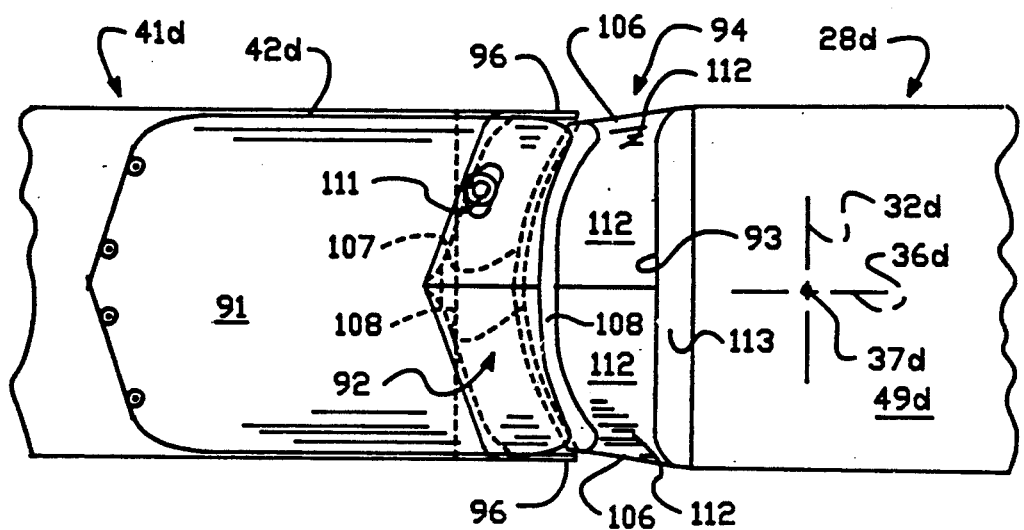
FIG. 6B is a fragmentary, top elevation view of the tractor-trailer assembly of FIG. 6A.

FIGS. 6A-6C illustrate the tractor-trailer drag reduction apparatus and method of the present invention as applied to an actual truck, in this case a PETERBILT Model 372 cab assembly 42d and a rectangular box trailer assembly 28d. The tractor portion 41d includes a cab assembly 42d with a cab roof fairing 91 that extends to substantially the same height as the top surface 49d of the trailer. Mounted on the rear portion of cab assembly 42d is a cab fairing hardware assembly, generally designated 92 and best seen in FIG. 6C. Mounted to the front wall 93 of the rectangular box-like trailer body is a trailer nose cone assembly, generally designated 94 and best seen in FIG. 6C.

Trailer 28d is coupled to tractor 41d by a standard fifth wheel assembly 21d for relative yaw about yaw axis 33d and relative pitch about pitch axis 32d. The pitch and yaw axes intersect each other at pivot point 37d, as has been described in connection with the embodiments set forth above. Finally, the tractor-trailer assembly also has a roll axis 36d about which the tractor will twist or helix.

In order to minimize skin gap, the cab-mounted fairing assembly 92 extends back toward nose cone assembly 94 to a position proximate a virtual surface that would be swept by the nose cone and side panels of the trailer during maximum designed or required yaw and pitch, with additional clearance being provided for maximum roll, manufacturing tolerances, elastic deformations and fifth wheel clearances. Thus, the cab-mounted fairing assembly 92 can be seen to be comprised of side extension panel portions 96 which are planar and coupled to upper side extension panel portions 97. Together these side panel portions define a trailing edge 99 which is forwardly pitched by an amount equal to the maximum upward pitch of the trailer, in this case about 7 degrees. As will be appreciated, therefore, edge 99 will accommodate a 90 degree trailer yaw about axis 33d and a 7 degree trailer upward pitch about axis 32d. In fact, the design permitted yawing over 100 degrees about axis 33d.

The top skin of fairing assembly 92 is comprised of a transition surfaces 102, which also extend the top roof fairing 91 of the cab assembly. The trailing edge 103 approximates a circle about yaw axis 33d, but it is slightly scalloped by reason of the adaptation between the roof fairing and trailer top surface. Arcuate edge 104 provides clearance for pitched and yawed trailer edge 58 and lies on an arc having a center of curvature on pitch axis 32d.

As will be seen best from FIG. 6B, the lower cab fairing panel portions 96 shingle with converging planar sides 106 of nose cone assembly 94.

Nose cone assembly 94 includes a cylindrical front surface or wall portion 107 which has its central axis on yaw axis 33d. Since the nose cone is retrofit to the PETERBILT Model 372 tractor, cylindrical surface 107 cannot merely extend up to a spherical surface 108, which has a center of curvature at pivot point 37d. Instead, a conical surface 109 is provided to enable the nose cone to clear muffler standpipe 111 under maximum upward pitch. Finally, nose cone 94 includes transition panels 112 and planar panel 113.

As can be seen from FIG. 6A, the combination of cab-mounted faring assembly 92 and nose cone assembly 94 results in a tractor-trailer assembly in which the two components are nested in each other. Notwithstanding this nesting, the truck assembly of FIGS. 6A-6C can be yawed in both directions from straight-ahead running by 100 degrees, can be upwardly pitched by 7 degrees, and rolled in either direction by 7 degrees without nose cone 94 touching fairing assembly 92. In straight-ahead running, the opposed cab and trailer skin edges are extremely close together and the volume between the two bodies has been substantially reduced by the nose cone. No attempt was made in this adaptation to provide a mating cab assembly rear wall between the opposed sides of the cab fairing assembly, but such a panel also could be provided.

In this design the clearance distance chosen to accommodate 7 degrees of relative required roll in both directions, clearances in fifth wheel assembly 21d and manufacturing tolerances was only 50 millimeters.

The aerodynamic effect of the cab extension and trailer nose cone has been tested in a wind tunnel and a drag improvement of 2.7% was achieved, when compared to an unmodified tractor-trailer with commercial nose cone set at a 36 inch gap between cab and trailer. At an assumed fuel economy of 6.5 miles per gallon, fuel cost of $1.40 per gallon and average mileage of 150,000 miles per year, the drag reduction produced by the fairing assembly 92 and nose cone 94 is estimated at 1.5% or about $485.00 per year.

As will be seen in FIG. 6A, the fifth wheel assembly is set at about the center line of the tractor bogie. In order to maintain some flexibility for users who need to move the positioning of their fifth wheel longitudinally along frame rail 22d, the closest gap could be set at the most likely forward position of fifth wheel 21d, with any positioning of the fifth wheel rearwardly producing some loss in the aerodynamic effectiveness.

The method of reducing drag by minimizing the skin gap of the present invention can be approached by generating the trailer skin leading edges and the cab skin trailing edges from the yaw, pitch and roll axis by considering the combination of the full range of movements in yaw, upward pitch and roll about the respective axes.

In the most optimal mating possible, both the cab assembly rear wall and the trailer assembly front wall are provided as mating surfaces having a center of curvature proximate the intersection of the yaw and pitch axes. The cab assembly rear wall has a radius of curvature which is greater than the radius of curvature of the trailer front wall only by the combination of manufacturing tolerances, clearances in the fifth wheel assembly, elastic deformation and a distance sufficient to accommodate maximum required roll.

Various compromise mating cab and trailer systems are also possible in which skin gap and gap volume are somewhat increased to achieve other goals, such as enhanced cab interior volume, retro-fitting and enhanced trailer interior volume.

What is claimed is:

1. A truck tractor-trailer assembly having reduced aerodynamic drag comprising:
   a trailer having a trailer body with a trailer top skin and oppositely facing trailer side skins, said trailer top skin and said trailer side skins extending longitudinally and terminating in leading trailer skin edges, said trailer body further having a front wall extending transversely between said trailer side skins and having a bottom wall;
   a tractor having a frame with a cab assembly mounted to said frame, said cab assembly having a cab top skin and oppositely facing cab side skins extending longitudinally toward said trailer body and terminating in trailing cab skin edges spaced apart from said leading trailer skin edges, said cab assembly having a rear wall extending transversely between said cab side skins;
   a fifth wheel assembly coupling said bottom wall of said trailer to said frame of said tractor for pivotal movement about a substantially vertical yaw axis and a substantially horizontal pitch axis; and
   at least one of said trailing can skin edges and said rear wall being positioned substantially as close to a respective one of said leading trailer skin edges and said front wall as is permitting by the full range of relative required yaw of said tractor and said trailer, plus the full range of relative required upward pitch of said tractor and said trailer, plus a minimum clearance distance.

2. The truck tractor-trailer assembly as defined in claim 1 wherein,
   said minimum clearance distance is defined by a combination of the full range of relative required roll of said tractor frame about a substantially longitudinal central axis along said frame, plus manufacturing tolerances of said tractor and said trailer, plus clearances in said fifth wheel assembly, plus elastic deformations of said tractor and said trailer.

3. The truck tractor-trailer assembly as defined in claim 1 wherein:
   said trailing cab skin edges are relieved in the most elevated and transversely outward regions from said fifth wheel assembly to accommodate the full range of relative required roll of said tractor frame about a substantially longitudinal central axis along said frame of said tractor.

4. The truck tractor-trailer assembly as defined in claim 3 wherein,
   said minimum clearance distance is defined by a combination of manufacturing tolerances of said tractor and said trailer, plus clearances in said fifth wheel assembly, plus elastic deformations of said tractor and said trailer.

5. In a truck tractor-trailer assembly including a trailer having a trailer body with a bottom wall, and a trailer skin formed by a trailer top skin means and trailer side skin means extending longitudinally and terminating in leading trailer skin edges; a tractor with a frame and a cab assembly mounted to said frame, said cab assembly having a cab skin formed by a cab top skin means and cab side skin means extending longitudinally toward said trailer body and terminating in trailing cab skin edges; and a fifth wheel assembly pivotally coupling said bottom wall of said trailer to said frame of said tractor, said tractor and said trailer being coupled by said fifth wheel assembly for substantial longitudinal alignment of said trailer top skin means and said trailer side skins means with said cab top skin means and said cab side skin means, respectively, and juxtapositioning of said trailing cab skin edges in longitudinal spaced relation to said leading trailer skin edges, the improvement in said tractor-trailer assembly providing reduced aerodynamic drag comprising:
   said trailing cab skin edges and said leading trailer skin edges being positioned as close as determined by a combination of:
   (i) a maximum range of required relative yaw in both directions of said tractor and said trailer about a substantially vertical yaw axis positioned through said fifth wheel assembly, and
   (ii) a maximum range of required relative upward pitch of said tractor and said trailer about a substantially horizontal pitch axis positioned below said bottom wall of said trailer through said fifth wheel assembly, plus
   (iii) a minimum clearance distance determined by a combination of manufacturing tolerances, elastic deformations of said tractor and said trailer and clearances in said fifth wheel assembly.

6. The truck tractor-trailer assembly as defined in claim 5 wherein,
   said minimum clearance distance further includes a distance sufficient to accommodate the full range of relative required roll of said frame about a substantially longitudinal central axis along said frame.

7. The truck tractor-trailer assembly as defined in claim 6 wherein,
   said cab assembly has a rearwardly facing rear wall means intermediate said trailing cab skin edges,
   said trailer assembly has a forwardly facing front wall means intermediate said leading trailer skin edges, and
   the shape of said rear wall means and said front wall means are determined by a combination of said range of required yaw, plus said range of required upward pitch, plus said minimum clearance distance.

8. The truck tractor-trailer assembly as defined in claim 7 wherein,
   said trailer body has substantially the same transverse frontal cross section as said cab assembly; and
   said rear wall means of said cab assembly is provided by at least one of a rear wall of tractor cab, a rear wall of a sleeper box and a rear wall of a fairing assembly.

9. The truck tractor-trailer assembly as defined in claim 7 wherein,
   said yaw axis and said pitch axis are intersecting and said roll axis is below said pitch axis; and
   at least a portion of said rear wall means and a corresponding portion of said front wall means are formed as concentric concaved surfaces having centers of curvature proximate the intersection of said yaw axis and said pitch axis.

10. The truck tractor-trailer assembly as defined in claim 9 wherein,
said portion of said front wall means and said portion of said rear wall means are both spherical surfaces; and
the radius of curvature of said rear wall means is sufficiently larger than the radius of curvature of said front wall means in order to maintain a gap distance therebetween equal to said minimum clearance distance.

11. The truck tractor-trailer assembly as defined in claim 9 wherein,
said concentric concaved surfaces are provided in the most elevated portions of said rear wall means and said front wall means relative to said fifth wheel means.

12. The truck tractor-trailer assembly as defined in claim 6 wherein,
said maximum range of required relative roll is not greater than about 5 degrees in both directions about said roll axis;
said maximum range of required relative yaw is not greater than about 90 degrees in both directions about said yaw axis; and
said maximum range of required relative upward pitch is not greater than about 5 degrees from said pitch axis.

13. The truck tractor-trailer assembly as defined in claim 6 wherein,
said maximum range of required relative roll is not greater than about 7 degrees in both directions about said roll axis;
said maximum range of required relative yaw is not greater than about 110 degrees in both directions about said yaw axis; and
said maximum required relative upward pitch is not greater than about 7 degrees from said pitch axis.

14. The truck tractor-trailer assembly as defined in claim 6 wherein,
said trailer has a body with substantially planar opposed vertical trailer side walls, a substantially planar horizontal trailer top wall and a substantially planar vertical forwardly facing trailer front wall, and
said cab skin extends toward said trailer side walls and said trailer top walls to as close as possible to said trailer body while still permitting full ranges of yaw and pitch plus said minimum clearance distance.

15. The truck tractor-trailer assembly as defined in claim 14 wherein,
said cab skin is provided by a rearwardly extending fairing assembly mounted to a tractor cab to comprise said cab assembly.

16. The truck tractor-trailer assembly as defined in claim 9 wherein,
said rear wall means and said front wall means are both formed with a plurality of substantially spherical mating and concentric surfaces each having a center of curvature proximate the intersection of said pitch axis and said yaw axis.

17. The truck tractor-trailer assembly as defined in claim 16 wherein,
said rear wall means and said front wall means each include at least one pitch compensation surface connecting arcuately adjacent spherical mating concentric surfaces.

18. The truck tractor-trailer assembly as defined in claim 17 wherein,
said pitch compensation surface on said rear wall means and said pitch compensation surface on said front wall means each are substantially conical surfaces having apexes on said yaw axis.

19. The truck tractor-trailer assembly as defined in claim 10 wherein,
said rear wall means and said front wall means are each formed with lower portions which are concentric surfaces of revolution about said yaw axis when said tractor and said trailer are in maximum required relative upward pitch condition; and
the spherical surface of said rear wall means and the spherical surface of said front wall means are positioned above said lower portions.

20. The truck tractor-trailer assembly as defined in claim 19 wherein,
said surfaces of revolution are cylindrical surfaces.

21. The truck tractor-trailer assembly as defined in claim 19 wherein,
said surfaces of revolution are conical surfaces.

22. A transport assembly comprising:
a trailer having a body with trailer front wall means, trailer bottom wall means, trailer side wall means, and trailer top wall means;
a tractor having a frame, a cab assembly mounted on said frame and having body with cab rear wall means, cab side wall means, and cab top wall means;
a fifth wheel assembly coupling said trailer bottom wall means to said frame of said tractor for pivotal movement, said fifth wheel assembly providing a coupling having a substantially horizontal transverse pitch axis disposed proximate said trailer bottom wall means and a substantially vertical yaw axis disposed proximate said pitch axis and proximate a longitudinal centerline of said trailer;
said tractor frame being resiliently helically flexible about a longitudinally extending substantially horizontal roll axis disposed proximate and below said pitch axis;
said trailer having a transverse frontal cross sectional area and shape not substantially greater than a transverse frontal cross sectional area of said cab assembly proximate said cab rear wall means;
said cab side wall means and said cab top wall means extending rearwardly toward said trailer side wall means and said trailer top wall means and terminating in trailing cab edges positioned substantially on a virtual surface minimizing the skin gap area between said cab assembly and said trailer, said virtual surface being limited and defined by leading trailer edges of said trailer top wall means and said trailer side wall means when:
(a) swept through a curved path having radial sweep distances from the yaw and pitch axes determined by relative articulation of said tractor and said trailer through a combination of:
(i) maximum required yaw in both directions about said yaw axis, and
(ii) maximum required upward pitch about said pitch axis; and
(b) adding a minimum radial clearance distance to said radial sweep distances sufficient to accommodate a combination of clearances in said fifth wheel assembly, manufacturing tolerances of said tractor and trailer, elastic deformation of said tractor and said trailer, and maximum required roll in both directions about said roll axis; and said tractor rear wall means intermediate said trailing cab edges being positioned no closer to said trailer than said virtual surface as defined by said leading trailer edges.

23. In a truck tractor assembly for use with a trailer having a trailer body with a bottom wall and a trailer top skin and trailer side skins extending longitudinally and terminating in leading trailer skin edges, said tractor assembly including a tractor frame, a cab assembly mounted to said frame, said cab assembly having a cab body with a cab top skin and cab side skins extending longitudinally toward said trailer body and terminating in trailing cab skin edges, and a portion of a fifth wheel assembly for pivotally coupling said bottom wall of said trailer to said frame of said tractor, the improvement in said tractor assembly comprising:

said trailing cab skin edges being located as close to said leading trailer skin edges as determined by a combination of:

(i) a maximum required relative yaw in both directions of said tractor and said trailer about a substantially vertical yaw axis positioned through said fifth wheel assembly, and (ii) a maximum required relative upward pitch of said tractor and said trailer about a substantially horizontal pitch axis positioned below said bottom wall of said trailer through said fifth wheel assembly, and (iii) a clearance distance determined by a combination of manufacturing tolerances, clearances in said fifth wheel assembly, elastic deformation of said tractor and said trailer and maximum required relative roll in both directions of said tractor and said trailer about a horizontally extending roll axis positioned to intersect said yaw axis below said pitch axis.

24. The truck tractor as defined in claim 23 wherein, said trailing cab skin edges fall on a concave surface having a center of curvature substantially at an intersection between said yaw axis and said pitch axis.

25. The truck tractor as defined in claim 23 wherein, said cab assembly is formed with rear wall means having a substantially spheroidal surface proximate a top edge thereof.

26. The truck tractor as defined in claim 25 wherein, cab rear wall means is formed with a surface of revolution about said yaw axis in a maximum upwardly pitched condition.

27. The truck tractor as defined in claim 23 wherein, said cab assembly includes a top wall having a rearwardly facing top edge falling on a surface of revolution about said yaw axis when in a maximum required upward pitched condition, said top edge connecting rearwardly facing side edges of side walls of said cab assembly; and said rear wall means is recessed forwardly from said surface of revolution.

28. The truck tractor as defined in claim 23 wherein, said cab assembly is formed with rear wall means provided by one of a rear wall of a cab, a rear wall of a sleeper box and a rear wall of a fairing assembly.

29. The truck tractor as defined in claim 28 wherein, said rear wall means is formed with a substantially spheroidal surface portion extending over an arc sufficient to accommodate relative articulation between said tractor and a front wall of a trailer coupled to said tractor by said fifth wheel assembly by an amount equal to the combination of at least about 5 degrees upward pitch about said pitch axis, and at least about 90 degrees yaw in both direction about said yaw axis.

30. The truck tractor as defined in claim 29 wherein, said rear wall means is formed as a substantially spherical rear wall.

31. The truck tractor as defined in claim 29 wherein, said rear wall means is formed with a plurality of substantially spheroidal surface each having a center of curvature proximate an intersection of said pitch axis and said yaw axis.

32. The truck tractor as defined in claim 31 wherein, said rear wall means includes at least one pitch compensation surface connecting arcuately adjacent spheroidal surfaces.

33. In a truck trailer assembly for use with a truck tractor having a cab assembly with a cab top skin and oppositely facing cab side skins, said trailer assembly including a trailer body having a bottom wall and a trailer top skin and oppositely facing trailer side skins, and a portion of a fifth wheel assembly for pivotally coupling said bottom wall of said trailer to said tractor, the improvement in said trailer assembly comprising:

said trailer top skin and trailer side skins extending toward said cab assembly and terminating in leading trailer skin edges, said cab top skin and cab side skins extending toward said trailer body and terminating in leading trailer skin edges, said leading trailer skin edges being spaced longitudinally from trailing cab skin edges of said tractor, said leading trailer skin edges being located as close to said trailing cab skin edges as determined by a combination of:

(i) a maximum required relative yaw in both directions of said tractor and said trailer about a substantially vertical yaw axis positioned through said fifth wheel assembly, and (ii) a maximum required relative upward pitch of said tractor and said trailer about a substantially horizontal pitch axis positioned below said bottom wall of said trailer through said fifth wheel assembly, and (iii) a clearance distance determined by a combination of manufacturing tolerances, clearances in said fifth wheel assembly, elastic deformation of said tractor and said trailer and maximum required relative roll in both directions of said tractor and said trailer about a horizontally extending roll axis positioned to intersect said yaw axis below said pitch axis.

34. The truck trailer as defined in claim 33 wherein, said leading edges fall on a convex surface having a center of curvature substantially at an intersection between said yaw axis and said pitch axis.

35. The truck trailer as defined in claim 33 wherein, said trailer is formed with front wall means having a substantially spheroidal surface proximate a top edge thereof.

36. The truck trailer as defined in claim 35 wherein, front wall means is formed with a surface of revolution about said yaw axis.

37. The truck trailer as defined in claim 33 wherein, said trailer includes a top wall having a forwardly facing top edge falling on a surface of revolution about said yaw axis, said top edge connecting forwardly facing leading side edges of side walls of said trailer; and said front wall means is recessed forwardly from said surface of revolution.

38. The truck tractor as defined in claim 36 wherein, said front wall means is formed with a substantially spheroidal surface portion extending over an arc sufficient to accommodate relative articulation between said trailer and a rear wall of said tractor coupled to said trailer by said fifth wheel assembly by an amount equal to the combination of at least about 5 degrees upward pitch about said pitch axis, and at least about 90 degrees yaw in both directions about said yaw axis.

39. The truck trailer as defined in claim 38 wherein, said front wall means is formed with a plurality of substantially spheroidal surface each having a center of curvature proximate an intersection of said pitch axis and said yaw axis.

40. The truck trailer as defined in claim 39 wherein, said front wall means includes at least one pitch compensation surface connecting arcuately adjacent spheroidal surfaces.

41. A method of reducing aerodynamic drag in a tractor-trailer assembly including a trailer having a body with a trailer skin, formed by a trailer top skin and oppositely facing trailer side skins, and a transversely extending front trailer wall means, a tractor having a cab assembly with a cab skin, formed by a cab top skin and oppositely facing cab side skins, and a transversely extending rear cab wall, and a fifth wheel assembly coupling a bottom wall of said trailer to said tractor, said method comprised of the step of:

forming one of: said front trailer wall to extend longitudinally toward said rear cab wall, and said trailer skin to extend longitudinally toward said cab skin, to positions substantially as close as possible while permitting a full range of required yaw and a full range of required upward pitch between said tractor and trailer plus a minimum clearance distance.

42. The method as defined in claim 41 wherein, said forming step is accomplished by employing a minimum clearance distance equal to a combination of required manufacturing tolerances of said tractor and said trailer, plus clearances in said fifth wheel assembly, plus elastic deformations of said tractor and said trailer.

43. The method as defined in claim 42 wherein, said forming step includes the step of relieving said cab assembly skin in areas most elevated and transversely outward from said fifth wheel assembly by an amount determined by a full range of required relative roll between said tractor and said trailer.

44. The method as defined in claim 41 wherein, said forming step is accomplished by employing a minimum clearance distance equal to a combination of required manufacturing tolerances of said tractor and said trailer, plus clearances in said fifth wheel assembly, plus elastic deformation of said tractor and said trailer, plus a full range of required relative roll between said tractor and said trailer.

45. The method as defined in claim 41 wherein, said forming step is accomplished by forming said trailer skin and said cab skin to be substantially as close together as possible.

46. The method as defined in claim 44 and the additional step of:

forming an opposed rear cab wall and a front trailer wall intermediate said cab skin and said trailer skin to extend as close as possible toward each other while permitting a full range of required yaw and a full range of required upward pitch between said tractor and said trailer plus a minimum clearance distance equal to a combination of required manufacturing tolerances of said tractor and said trailer, plus clearances in said fifth assembly, plus elastic deformation of said tractor and said trailer, plus a full range of required relative roll between said tractor and said trailer.

47. The method as defined in claim 46 wherein, said forming step is accomplished by forming said cab rear wall and said trailer front wall with concentric spherical surfaces proximate top edges thereof, said spherical surfaces having a center of curvature at an intersection between a yaw axis and a pitch axis of said fifth wheel assembly and differing radii of curvature determined by said minimum clearance distance.

48. The method as defined in claim 47 wherein, said forming step is accomplished by forming said spherical surfaces to extend over substantially a full height of said cab assembly and said trailer.

49. The method as defined in claim 47 wherein, said forming step is accomplished by forming said trailer front wall with a surface of revolution about a yaw axis through said fifth wheel assembly below the spherical surface, and forming said cab rear wall with a surface of revolution concentric to said surface of revolution on said trailer front wall when said trailer front wall is in a maximum upward pitched condition.

* * * * *